US011072900B2

(12) United States Patent
Kettavong

(10) Patent No.: US 11,072,900 B2
(45) Date of Patent: Jul. 27, 2021

(54) SMART BREAKWALL DIVERSION SYSTEM

(71) Applicant: Pepsy M. Kettavong, Rochester, NY (US)

(72) Inventor: Pepsy M. Kettavong, Rochester, NY (US)

(\*) Notice: Subject to any disclaimer, the term of this patent is extended or adjusted under 35 U.S.C. 154(b) by 0 days.

(21) Appl. No.: 17/070,466

(22) Filed: Oct. 14, 2020

(65) Prior Publication Data

US 2021/0115639 A1 Apr. 22, 2021

Related U.S. Application Data

(63) Continuation of application No. 16/940,230, filed on Jul. 27, 2020.

(60) Provisional application No. 62/924,381, filed on Oct. 22, 2019.

(51) Int. Cl.
*E02B 3/06* (2006.01)

(52) U.S. Cl.
CPC ..................... *E02B 3/06* (2013.01)

(58) Field of Classification Search
CPC ..... E02B 3/04; E02B 3/06; E02B 3/10; E02B 3/066; E02B 7/02
See application file for complete search history.

(56) References Cited

U.S. PATENT DOCUMENTS

| 3,490,239 | A | * | 1/1970 | Vincent | E02B 3/06 405/31 |
| 3,538,710 | A | * | 11/1970 | Tourmen | E02B 3/06 405/31 |
| 3,548,600 | A | * | 12/1970 | Stolk | E02B 3/14 405/30 |
| 4,407,608 | A | * | 10/1983 | Hubbard | E02B 3/06 405/31 |
| 4,666,334 | A | * | 5/1987 | Karaus | E02B 11/00 405/31 |
| 4,784,521 | A |  | 11/1988 | Martin et al. | |
| 5,125,765 | A | * | 6/1992 | Verble | A01K 29/00 405/31 |
| 5,238,326 | A | * | 8/1993 | Creter | E02B 3/06 405/25 |
| 5,655,851 | A | * | 8/1997 | Chor | E02B 3/06 405/15 |

(Continued)

FOREIGN PATENT DOCUMENTS

| RU | 2310708 C2 | 11/2007 | |
| RU | 2459032 C1 | 8/2012 | |
| WO | WO-2019142201 A1 | * 7/2019 | ........ E02B 3/06 |

*Primary Examiner* — Benjamin F Fiorello
(74) *Attorney, Agent, or Firm* — Vincent G. LoTempio

(57) ABSTRACT

A system is provided for diverting water at a shoreline to prevent erosion. The smart breakwall diversion system provides a resilient design that uses incoming water-flow to reduce the impact of wave action on a shoreline. Features of the system include openings and diverters that absorb and redirect the flow of wave forces. A laser-cut pattern on a steel cover of the front of the system can be artist-designed and act as protection against floating debris, as well as prevent fish and other aquatic life from entering. A step diverter design reduces velocity of incoming water and redirects it back towards the body of water in a controlled manner. The smart breakwall diversion system decreases the impact of wave energy on immediate and surrounding waterfront property.

20 Claims, 9 Drawing Sheets

(56) References Cited

U.S. PATENT DOCUMENTS

| | | | | |
|---|---|---|---|---|
| 8,226,325 B1* | 7/2012 | Pierce, Jr. | ............. | E02B 3/06 |
| | | | | 405/30 |
| 2005/0100408 A1* | 5/2005 | de Andrade | ............. | E02B 3/06 |
| | | | | 405/21 |
| 2006/0056913 A1* | 3/2006 | Herzog | ............. | E02B 3/04 |
| | | | | 405/25 |
| 2006/0104719 A1* | 5/2006 | Fainman | ............. | E02B 3/06 |
| | | | | 405/21 |
| 2006/0159518 A1* | 7/2006 | Cravens | ............. | B29C 41/386 |
| | | | | 405/16 |
| 2008/0175667 A1* | 7/2008 | Liou | ............. | F03B 13/148 |
| | | | | 405/25 |
| 2011/0236132 A1* | 9/2011 | Wisegerber | ............. | E02B 3/04 |
| | | | | 405/30 |
| 2012/0315089 A1* | 12/2012 | Burns | ............. | E02D 31/002 |
| | | | | 405/16 |
| 2013/0022399 A1* | 1/2013 | Pierce, Jr. | ............. | E02B 7/02 |
| | | | | 405/31 |
| 2013/0058720 A1* | 3/2013 | Marcello | ............. | E02B 3/102 |
| | | | | 405/21 |
| 2014/0314484 A1* | 10/2014 | Pierce, Jr. | ............. | E02B 3/023 |
| | | | | 405/31 |
| 2016/0312427 A1* | 10/2016 | De Groot | ............. | E02B 3/14 |

* cited by examiner

SMART BREAKWALL DIVERSION SYSTEM

CROSS REFERENCE OF RELATED APPLICATIONS

This application is a continuation and claims the benefit of priority from co-pending U.S. utility nonprovisional patent application Ser. No. 16/940,230, filed Jul. 27, 2020, and additionally claims the benefits of U.S. utility provisional application Ser. No. 62/924,381 filed Oct. 22, 2019, the full disclosure of both applications are incorporated by reference herein in their entirety.

FIELD OF THE INVENTION

The present disclosure relates to breakwall system for a shoreline.

BACKGROUND OF THE INVENTION

With the advent of climate change and increasing development along shorelines, shoreline erosion control has become an issue of great importance. Various systems have been developed to attempt to prevent erosion while maintaining an aesthetically appealing shorefront. Existing systems, however, have all been shown to have limitations and improved technology is needed to address the problem of shoreline erosion.

Conventional sea wall systems such as steel sheet pile walls, monolithic concrete barriers, rubble mound structures, revetments (brick, block & large boulder walls) and gabions (steel cage filled with rip rap) all suffer from the same intrinsic flaw, in that they all work against wave energy and do not take advantage of wave energy to prevent erosion. Conventional systems are not resilient and do not support the co-existence of quality of life and natural habitats.

Solid sheet pile or solid concrete break walls absorb 100% of wave energy, thereby weakening structural integrity of the sea wall and distributing the wave energy to surrounding shoreline, thereby causing damage. For example, a house twenty feet from sheet pile will shake upon wave impact. Further, dissipating wave energy will cause damage to the neighboring properties.

A steel cage fill with stones, a revetment (large stones with a break wall) and rubble mount structures generally absorb about 75-80% of wave energy when newly constructed. Over time, however, this percentage decreases substantially due to the force of wave energy moving the stones out toward the body of water, thus causing them to sink into the sea or lake bed, and thereby weakening the rubble structure.

SUMMARY

The present disclosure, or Smart Breakwall Diversion System (SBDS), provides a resilient design that uses water-flow to its advantage through a unique void-opening and various diverter systems that redirect and absorb the flow of wave energy. A laser-cut void pattern can be artist-designed and act as protection against floating debris (wooden logs, trash) and can also prevent fish from entering. A step diverter design slows down wave energy and redirects it back towards the lake in a controlled manner. A pressure release cover plate may also act as a drainage system. SBDS absorbs and redirects the force of wave energy, thereby decreasing its impact to surrounding residents.

In addition, integrated stone may not only absorb the under-wave current, it provides essential structural base elements and creates an environment for aquatic life. SBDS has been designed for managing coastal erosion & flooding, while also creating harmony for the living creatures at the shoreline. The system of the present disclosure increases quality of life for residents, while respecting and protecting the environment so that man-made systems and natural environments can co-exist. SBDS will require little maintenance and has the ability to adapt by adding another SBDS deflector extension to meet higher water levels.

BRIEF DESCRIPTION OF THE DRAWINGS

The present invention and the manner in which it may be practiced is further illustrated with reference to the accompanying drawings wherein.

DETAILED DESCRIPTION OF THE INVENTION

Figure 1:
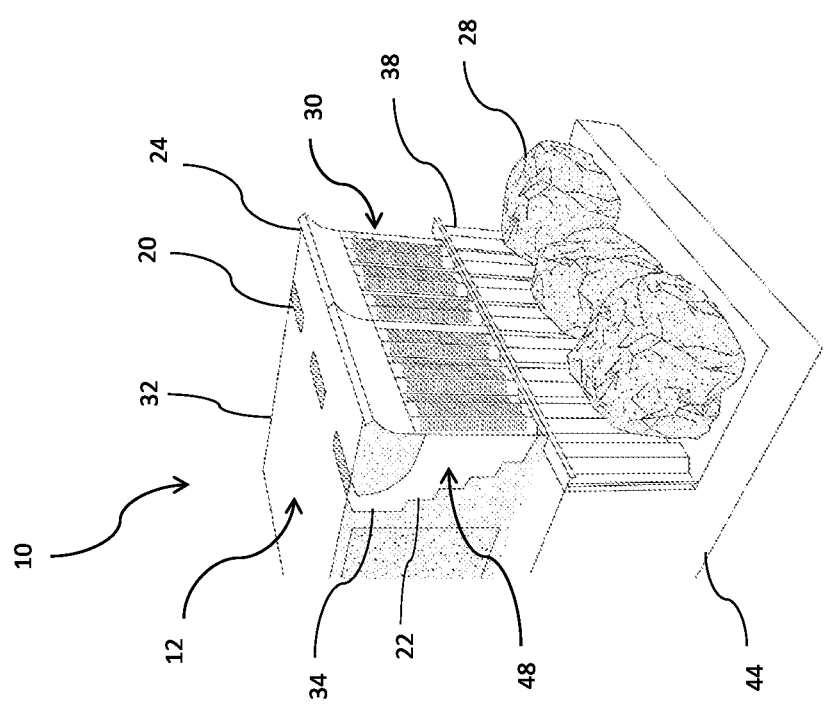
FIG. 1 shows a top perspective view of the system according to an embodiment of the present disclosure.

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this invention as required by 35 U.S.C. § 112. As used in the following description, the terms "horizontal", "vertical", "left", "right", "up", "down", as well as adjectival and adverbial derivatives thereof (e.g., "horizontally", "vertically", "upwardly", etc.) simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 2:
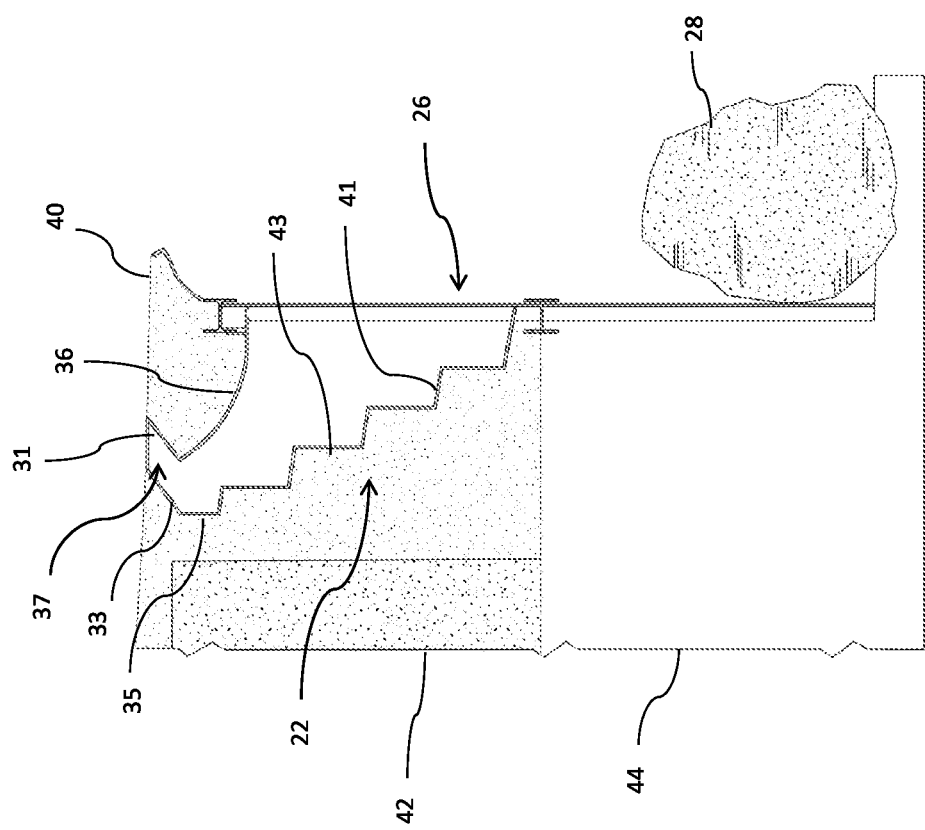
FIG. 2 shows a side cross-sectional view of the system according to an embodiment of the present disclosure.
Figure 5:
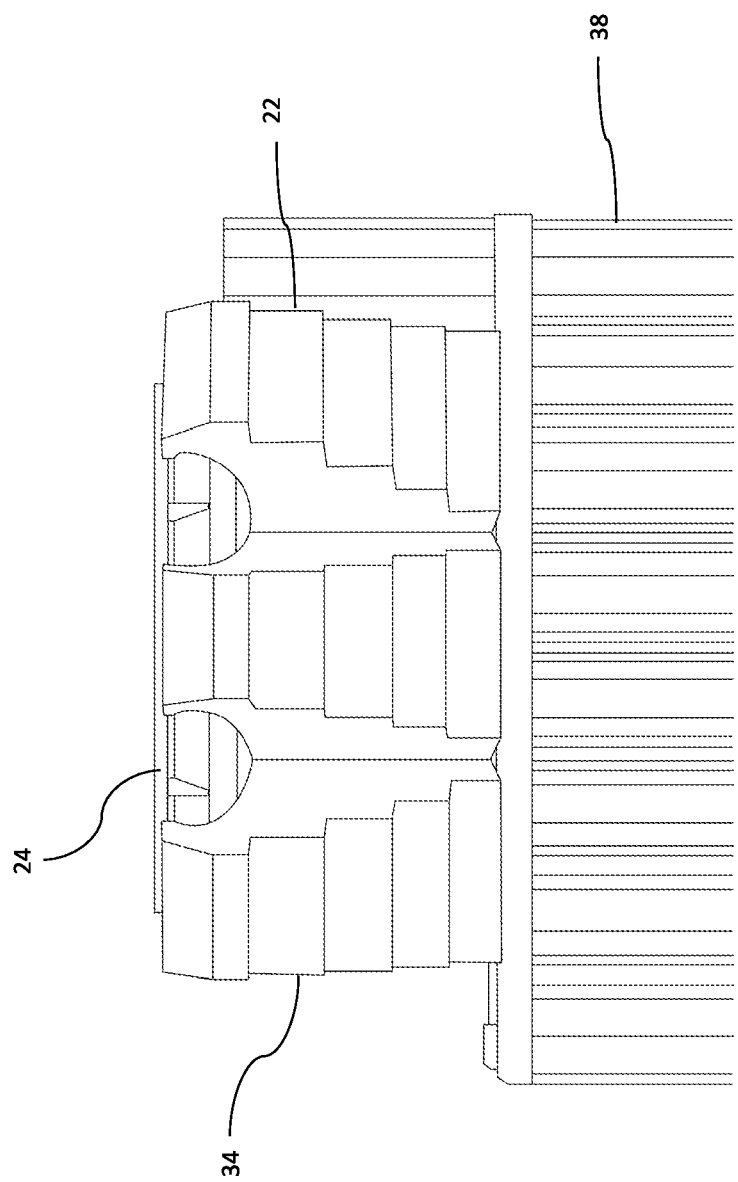
FIG. 5 shows a rear view of the system according to an embodiment of the present disclosure.

As shown in FIGS. 1 and 2, smart breakwall diversion system (SBDS) 10 includes a diverter 34 for directing water from waves back toward a body of water. SBDS 10 will generally include a plurality of diverters 34 positioned side by side, as shown in FIG. 5. In one embodiment SBDS 10 provides a resilient design that uses water-flow to its advantage through diverters 34 that redirect and absorb the flow of wave energy. SBDS 10 has interconnecting modular sections that when assembled create a resilient system that absorbs and re-directs natural water waves back to their natural environment. SBDS 10 absorbs and redirects the force of wave energy, thereby decreasing its impact to surrounding residents at the waterfront. Water enters through an inlet 26 in the front portion of SBDS 10 and exits through an outlet 20 in a top surface 12 of the diversion system. The design is such that water is redirected back toward the body of water through the top of the system 10.

Figure 3:
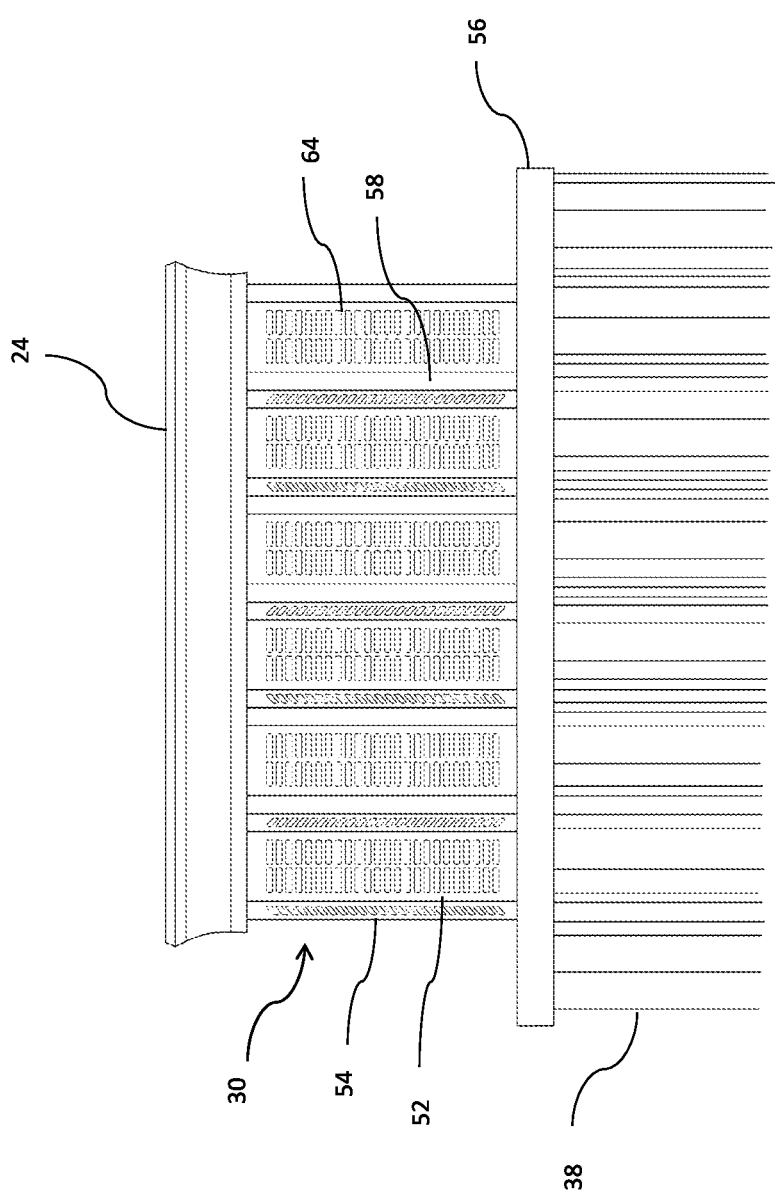
FIG. 3 shows a front view of the system according to an embodiment of the present disclosure.

SBDS 10 includes a cover 30 which, in one embodiment, may be formed into an inlet grate 64 (shown in FIG. 3). In other embodiments there may be an opening in front of the diverter, such that cover 30 does not block any water from entering diverter. In other embodiments, inlet grate 64 may be comprised of slots, apertures of any shape or size that would fit into cover 30. Water from waves passes through cover 30 and into a series of diverters 24. Diverter 24 has an inlet 26 into chute 48 into which the incoming water may pass. Chute 48 has a generally upward curved structure, such that water entering diverter 34 is directed up to an outlet channel 37 and back toward the body of water from which it came. In one embodiment, diverter 34 includes a series of steps 22 on a lower surface of diverter 34 designed to decrease wave energy and redirect it toward a body of water in a controlled manner. The diverter may have upper and lower curved surfaces. Once water is directed upward across steps 22, it is directed back toward the body of water through an outlet 20 in a concrete cap 32 of SBDS 10. In some embodiment diverter 34 may be metal surrounded by a concrete cap 32, whereas in other embodiments SBDS may be entirely comprised of concrete. Additional materials, such as fiberglass, plastic and moldable material may also be contemplated within the present disclosure.

In one embodiment, a base 44 supports diverter 34 and the concrete cap 32. Base 44 may be comprised of concrete an may include a front projecting portion that supports integrated stone 28. Integrated stone 28 may be placed on the base 44 in front of wall 38.

As shown in FIG. 2, steps 22 are located along chute 48 formed in diverter 34, where chute 48 forms an upward curve from inlet 26 to an outlet 20, where the outlet 20 is smaller than the inlet 26. The steps 22 are situated along the bottom surface of the curved diverter 34 and chute 48 and include treads 41 and risers 43. Treads 41 may be sloped downward at a slight angle from back to front, in one embodiment, while risers 43 may be vertical, as shown in FIG. 2. In some embodiments, treads 41 may be horizontal and risers 43 may be vertical, thus forming 90° angles between the two surfaces.

At the top of chute 48 is a top chute plate 35, which may be vertical, adjacent and below an outlet channel 37. Outlet channel 37 has a front channel plate 31 and a rear channel plate 33. These plates are generally parallel in a direction opposite of the incoming water in the lower portion of chute 48. An angle formed by channel outlet channel 37 may be of approximately 45°, relative to a vertical plane, although this angle may vary. In some embodiments the top chute plate 35 and the channel may merge into a curved section to form an outlet channel 37 that directs water back toward the body of water. In this embodiment, the top chute plate 35, rear channel plate and front channel plate may all be curved and together form an outlet channel 37 for directing water in the diverter back toward the body of water. Other configurations between the chute 48 and the outlet channel 37 are contemplated within the scope of the present disclosure, where the function of the chute 48 is to allow water to move in a direction away from the body of water and the function of the outlet channel 37 is to direct water in a direction back toward the body of water.

Each SBDS 10 may differ based upon the characteristics of the shoreline and the body of water. Adjustments to the system may be made, as would be known to one of ordinary skill in the art, to optimize the system based upon the characteristics of a particular environment. From outlet channel 37, incoming water from chute 48 is directed back toward a body of water through an outflow grate 62, as shown in FIG. 6a, which may also be referred to as an outflow cover. Outflow grate 62 at may also act as a drainage system.

At the upper front portion of SBDS 10 is deflector 40. Deflector 40 is located above cover 30 and inlet 26. Deflector may be a curved metal plate that directs incoming wave water back towards a body of water, without the water entering diverter 34. The height of SBDS 10 is generally designed to direct most incoming water into diverter 34, under certain wave conditions, some incoming water may reach SBDS 10 at a higher level than inlet 26 will accommodate. Therefore, deflector 40 will deflect some of this water away from the shoreline, thereby reducing the overall impact of the water on the shoreline property.

As shown in FIG. 2, integrated stone 28 rests on a front portion of base 44 and helps to absorb under wave current. Integrated stone 28 may not only absorb the under-wave current, but also provide essential structural base elements and create an environment for aquatic life. SBDS has been designed for managing coastal erosion and flooding, while also creating a harmonious and healthy environment for the aquatic and terrestrial animals at the shoreline. SBDS 10 increases quality of life for shoreline residents, while respecting and protecting the environment so that man-made systems and natural environments can co-exist. SBDS 10 requires little maintenance and can be adapted by adding additional deflectors extension to meet higher water levels.

FIG. 3 shows a front view of SBDS 10. Cover 30 is shown situated above wall 38. In one embodiment, wall 38 is comprised of steel, and may be a steel sheet pile. Cover 30 may be comprised of steel sheet pile and may have laser cut apertures to form a inlet grate 64. The grate apertures may be ½'" to 1" wide in one embodiment. The steel sheet pile that forms the inlet grate 64 in FIG. 3 may be between ¼" and 1" thick, and may be cut by an Amada® fiber optic laser cutting device. The cover 30 may have a receding grate section 54 and a front grate section 52. Further, sections of the sheet pile that form inlet grate 64 may be left uncut in order to provide structural support to cover 30. FIG. 3 shows an uncut portion of sheet pile, wherein the section is herein referred to as structural support section 58. Diverter 34, cover 30, deflector 24 and cement cap 32 are adjacent to beam 56, which may be and H-beam, in one embodiment of the present disclosure.

Figure 4:
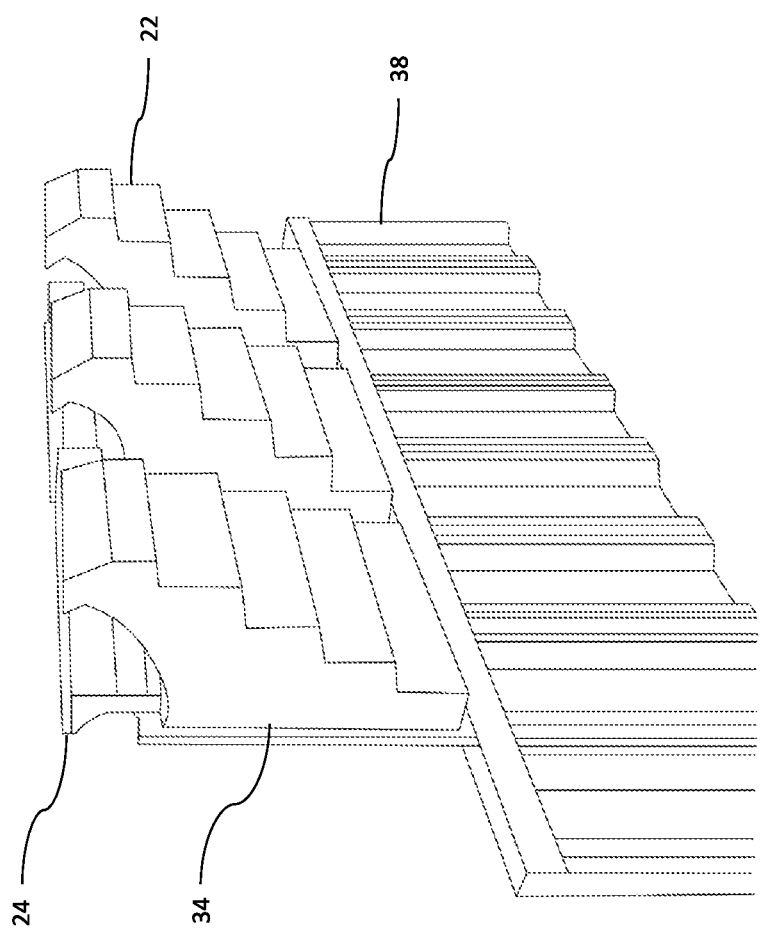
FIG. 4 shows a rear perspective view of the system according to an embodiment of the present disclosure.

Various shapes of diverters 34 are contemplated within the present disclosure. FIGS. 4 and 5 shows a tapered diverter 34. Tapered diverters decrease in width as the chute 28 reaches outlet 20. Thus, in tapered diverter 34, the outlet 20 will have a significantly narrower width than inlet 26.

Figure 6B:
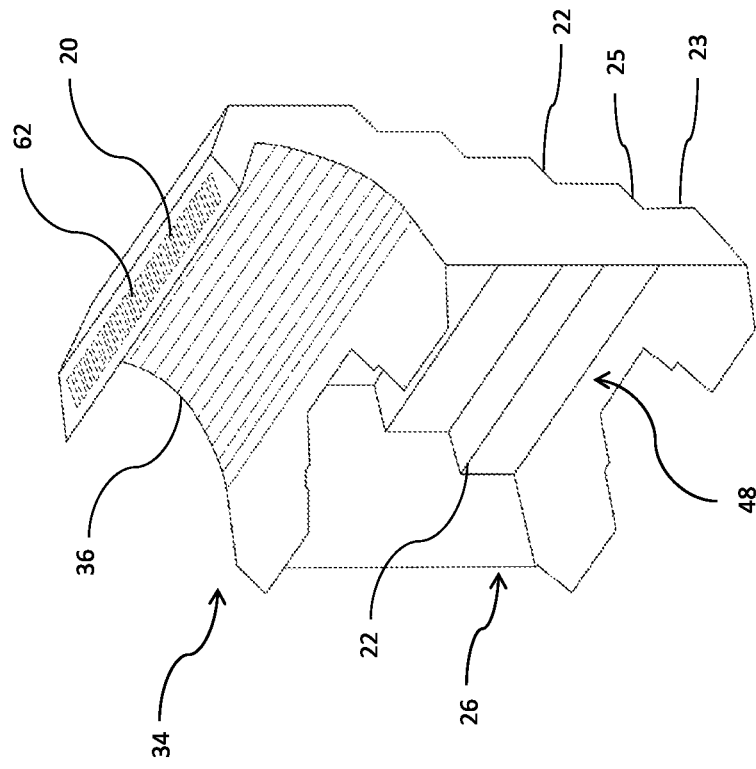
FIGS. 6a and 6b shows front perspective views of a square diverter and a tapered diverter according to an embodiment of the present disclosure.
Figure 6A:
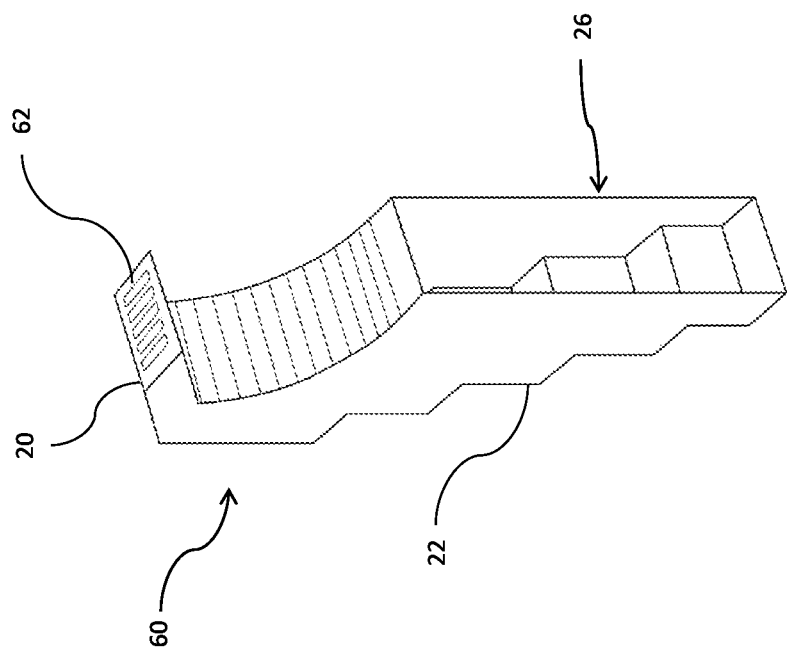

FIGS. 6a and 6b show a square diverter 60 and a tapered diverter 34, respectively. Square diverter 60 has a width at inlet 26 that is equal to the width of the diverter at outlet 20. Outlet 20 of square diverter 60, as shown in FIG. 6a, may include an outflow grate 62. FIG. 6b shows a tapered diverter 34, where inlet 26 has a greater with than outlet 20. In some embodiments, inlet 26 may have a width approximately twice that of outlet 20, as is most clearly shown in FIG. 5. FIGS. 6a and 6b are generally drawn to scale to represent embodiments of the present disclosure, as are other drawings in the present disclosure; however, the size and shape of structures shown in the drawings may vary without departing from the scope and spirit of the present disclosure.

Figure 7:
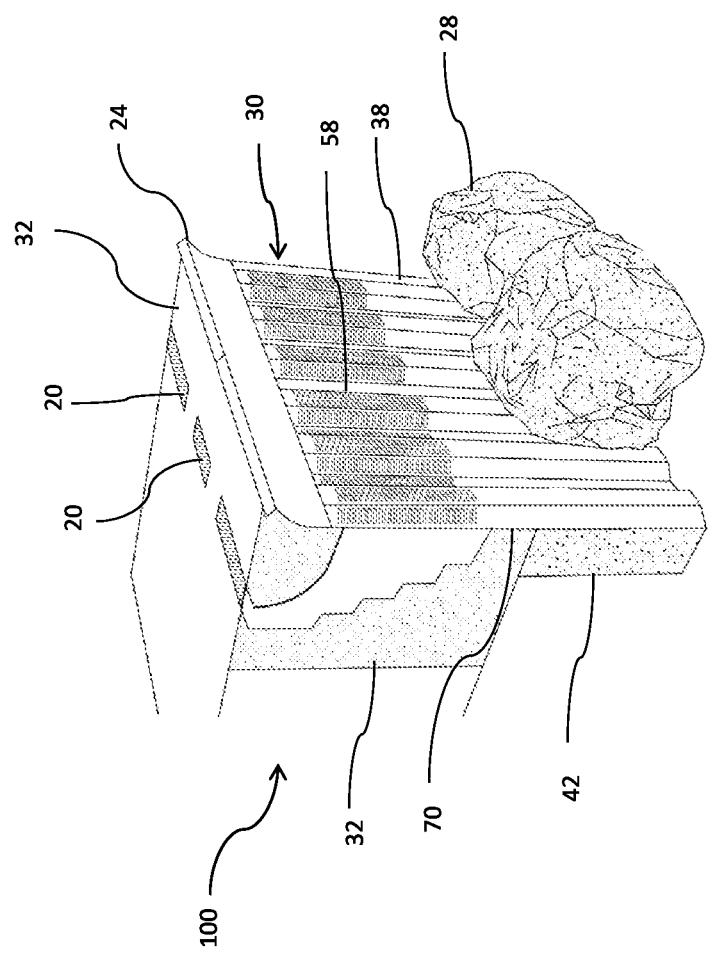
FIG. 7 shows a front perspective view of the system according to an embodiment of the present disclosure.

As shown in FIG. 7, one embodiment of the present disclosure includes both square diverters 60 and tapered diverters 34. In this embodiment, which may be referred to herein as DD, sheet pile 70 may be laser-cut to form inlet grate 64 at an appropriate level for installation. Sheet pile 70 may have a variety of shapes, including Z-shape, U-shape, hat shape, and straight shape. Support sections 58, also shown in FIG. 3, are left uncut to provide structural support to sheet pile 70. Support sections 58 may be located in indent segment receding portion 77. In this embodiment, sheet pile 70 is driven into the ground during installation, thus providing an integral wall and inlet grate 64. Support material 42, which may be stone, is placed behind wall 38 and below concrete cap 32. In this embodiment, integrated stone 28 may be placed in front of the wall 38.

Figure 8B:
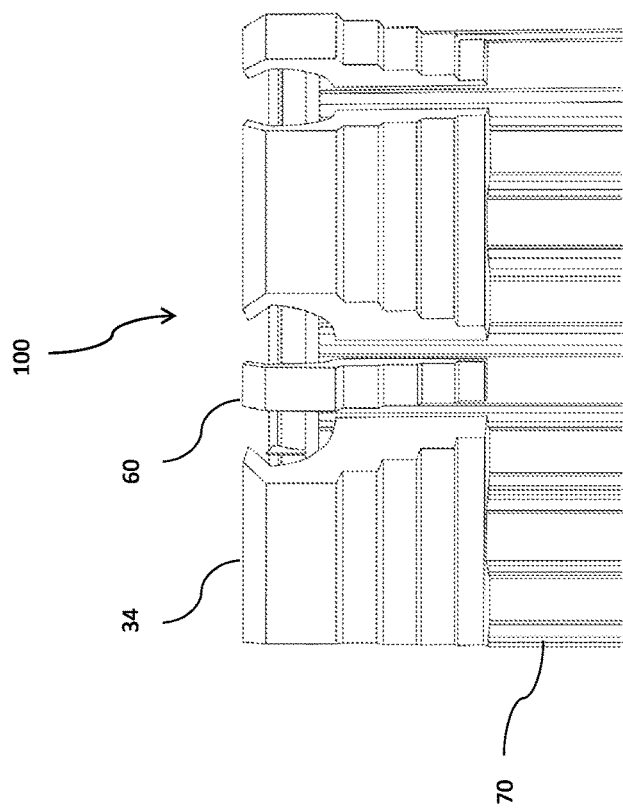
FIGS. 8a and 8b show a top view and a rear view, respectively, according to one embodiment of the present disclosure.
Figure 8A:
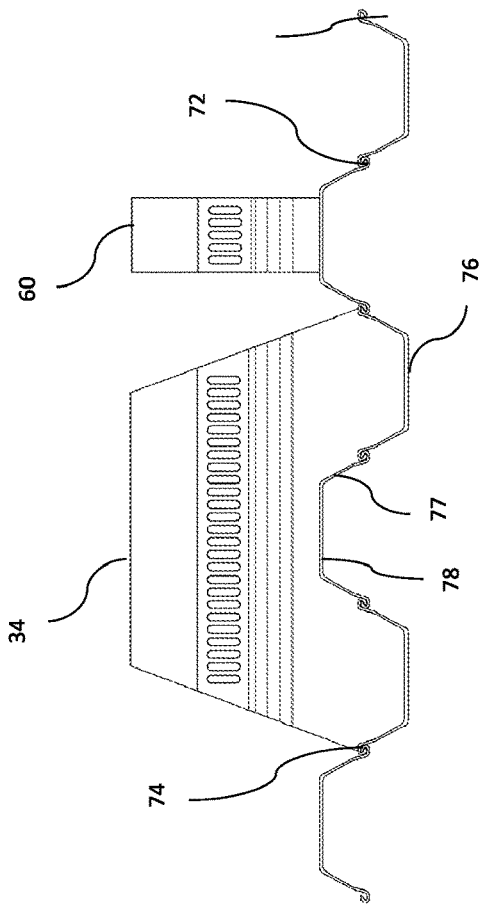

As shown in FIGS. 8a and 8b, in the alternating diverter smart breakwall system 100, or DD, embodiment of the present disclosure, tapered diverters 34 and square diverters 60 are alternately attached to cover 30. These diverters may be welded to the back of cover 30 at specific locations on sheet pile 70. Tapered diverter 34 is shaped and sized such that the front edges of tapered diverter 34 align with interconnections 72 in sheet pile 70. This attachment site is particularly advantageous for diverter and interconnection welded joint 74 due to the ease and strength of a weld at interconnection 72. Other welding sites on sheet pile 70 would not be as effective for attachment of tapered diverter 34. In one embodiment, tapered diverter 34 is sized to cover three segments of sheet pile. Adjacent to tapered diverter 34 is a square diverter 60 attached to a rear, horizontal portion of an indent segment 76 of sheet pile 70. Outdent segments 76 of sheet pile 70 face the body of water. Square diverter 60 may be welded to the indent segment 78.

In one embodiment of the present disclosure, alternating diverter smart breakwall system 100, tapered diverter 34 may have a curved plate chute radius of 1'-7¼". The deflector may have a radius of 1'-0". The height of tapered diverter 34 may be 5'-10⅞". The depth of the tapered diverter 34 may be 3'-2⅝". The height of the inlet 26 may be 3'-10⅞". The distance, from the front edge of tapered diverter 34 to the front edge of the front channel plate 48 at the outlet may be 1'-6¾". The depth of the outlet 20, from front to back, may be 8½". The distance from the rear channel plate 33 at the outlet to the back of tapered diverter 34 may be 11⅜". The outlet channel 37 may have a height of 8" and a depth of 19⅞", from the front edge of the outlet 20 to the back of tapered diverter 34. Outlet channel 37 may be 8½" wide. The height of the upper-most chute riser 43 may be 1'-7". The height of each step riser 43 may be 10", with the exception of the bottom-most step riser 43, which may have a height of 8". The height of the tread 41 of each step 22 may decrease by 1" from back to front such that the back of the tread 41 of the step 22 is 1" higher than the front of tread 41 the step 22. Each tread 41 of the step 22 may have a depth, from front to back, of 6⅜", while the bottom-most tread 41 may have a depth of 1'-1" and a decrease in height from back to front of 1⅞". The top of the concrete slab, or concrete cap 32 may be sloped downward toward the water at an angle of ¼" per 1'. The downward slope is intended to allow water to flow out of the inlet, rather than collect on step 22. In tapered diverter 34 of the DD embodiment, at the inlet, tapered diverter 34 may have a width of 5'-11". The outlet of tapered diverter 34 may have a width of 3'-0¼". The tapered diverter creates increased pressure on the water to help propel the incoming water from outlet 20 to the body of water.

With respect to square diverter 60, in alternating diverter smart breakwall system 100, square diverter 60 may have a curved plate chute radius of 1'-6". The height of square diverter 60 may be 5'-10". The height of the inlet may be 3'-10". The depth of square diverter 60 may be 2-6". The distance, from the front edge of square diverter 60 to the front edge of the front channel plate 31 at the outlet may be 11⅜". The depth of the outlet 20, from front to back, may be 8".

The distance from the rear channel plate 33 at the outlet 20 to the back of the square diverter 60 may be 10⅝". The outlet channel 37 may have a height of 8" and a depth of 18⅝", from the front edge of the outlet 20 to the back of square diverter 60. The outlet channel 37 may be 8" wide. The height of the top chute riser 43 may be 1'-7". The height of each step riser 43 may be 10", with the exception of the bottom-most step riser 43, which may have a height of 8". The height of the tread 41 of each step 22 may decrease by 1" from back to front such that the back of the tread 41 of the step is 1" higher than the front of tread 41 the step 22. Each tread 41 of step 22 may have a depth, from front to back, of 6". The top of the concrete slab, or concrete cap 32, may be sloped toward the water at a 2% angle from horizontal to allow for drainage. In one embodiment of square diverter 60, the inlet 26 and the outlet 20 may have a wide of 1'-0".

With a uniformly distributed water wave of arbitrary, uniform velocity and weather conditions, and including the Bernoulli effect of moving water being forced through each aperture, a 50-foot-long embodiment of the SBDS (DD embodiment) will absorb no less than 58.58% of incident water wave energy, diverting up to 41.42% of incident water wave energy. By comparison, a 50-foot-long perfectly flat, smooth breakwall will absorb 100% of incident water wave energy, diverting none of it. The SBDS (DD) diverts gradually more energy than with larger waves until the wave height exceeds the height of the aperture region. Larger heights of the system result in larger percentages of wave energy absorption.

Figure 9:
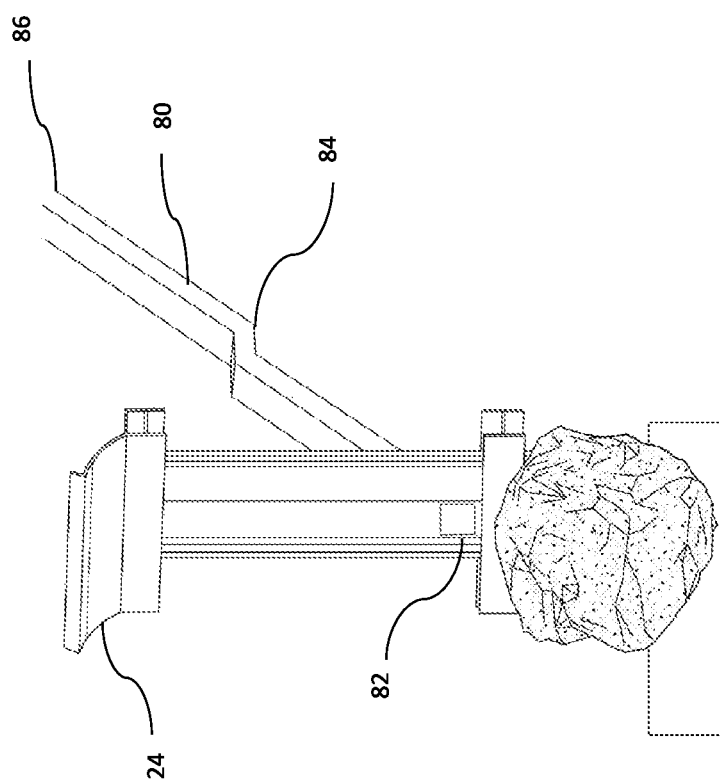
FIG. 9 shows front perspective view of the aquatic animal ramp according to an embodiment of the present disclosure

As shown in FIG. 9, one embodiment of the present disclosure may include a ramp 80 for aquatic animal access. This ramp would allow animals that access the water, but also live on dry land, to access both the water and the land without having to go around the SBDS 10. Ramp 80 has a lower ramp opening 82 that allows for animals to enter or exit ramp 80. The lower inner surface of ramp 80 may be textured to allow for a animal movement without slipping. Ramp 80 may have a ramp platform 84 to allow for a resting location for an animal that may be traversing the ramp. At the opposite end of ramp 80 from lower ramp opening 82 is upper ramp opening 86. Animals may enter and exit through upper ramp opening. Ramp 80 may be sized and shaped to allow for various sized animals to enter and exit ramp 80. Such animals may include frogs, birds, rodents, fox, fishers and other animals that may frequent a shoreline area.

Although the disclosure has been described with reference to certain preferred embodiments, it will be appreciated by those skilled in the art that modifications and variations may be made without departing from the spirit and scope of the disclosure. It should be understood that applicant does not intend to be limited to the particular details described above and illustrated in the accompanying drawings.

What is claimed is:

1. A breakwall system, comprising:
a diverter, the diverter being in fluid communication with a body of water;
the diverter having a cover and an inlet facing the body of water;
the inlet being substantially linear on at least three sides;
the diverter having a chute, wherein the chute has a lower diverter surface and an upper diverter surface, wherein the lower diverter surface and the upper diverter surface curve upward in the direction of a top surface of the diversion system;
the lower diverter surface having a plurality of steps;
wherein each step has a riser and a tread;
wherein the tread is substantially horizontal;
wherein a top chute plate connects to a rear channel plate;
the rear channel plate being positioned across from a front channel plate, thereby forming a channel;
the channel extending from the chute to an outlet in the top surface of the diversion system in a direction toward the body of water such that water is ejected from the channel toward the body of water; and
a deflector above the inlet, wherein the deflector comprises an upwardly and outwardly curved surface.

2. The breakwall system of claim 1, wherein each diverter is tapered in a horizontal direction such that the outlet is narrower than the inlet.

3. The breakwall system of claim 1, wherein the riser is vertical.

4. The breakwall system of claim 1, wherein the tread slopes downward toward the body of water.

5. The breakwall system of claim 1, wherein the diverter is comprised of steel.

6. The breakwall system of claim 1, wherein the diverter is comprised of metal encased in concrete.

7. The breakwall system of claim 1, further comprising a concrete base having a front extension for placement of integrated stone.

8. The breakwall system of claim 1, wherein the cover has a plurality of apertures for allowing water to pass through while blocking the entrance of foreign objects.

9. The breakwall system of claim 1, wherein the cover is comprised of laser cut apertures in sheet pile.

10. The breakwall system of claim 1, wherein the cover is integral with a sheet pile wall; wherein the sheet pile wall extends below the cover from the diverter to the ground; and wherein the sheet pile has been driven in to a ground.

11. The breakwall system of claim 1, wherein a plurality of diverters alternate between square diverters and tapered diverters.

12. The breakwall system of claim 1, wherein a plurality of diverters alternate between square diverters and tapered diverters; wherein a first side of a first tapered diverter is welded to a sheet pile cover at a first interconnection and a second side of the first tapered diverter is welded to the sheet pile cover at a second interconnection; wherein a distance between the first interconnection and the second interconnection is equivalent to three segments of sheet pile; wherein a square diverter is attached to a segment of sheet pile cover immediately adjacent to the first tapered diverter.

13. The breakwall system of claim 1, wherein the outlet is covered with an outflow grate and is flush with the top surface of the diversion system.

14. A breakwall system, comprising:
a diverter, the diverter being in fluid communication with a body of water; the diverter having a cover and an inlet facing a body of water;
the diverter having a chute, wherein the chute has a lower diverter surface and an upper diverter surface, wherein the lower diverter surface is curved upward in the direction of a top surface of the diversion system and wherein the lower diverter surface has a plurality of steps;
an outlet channel, the outlet channel extending from the chute to an opening in the top surface of the diversion system, the outlet channel having a front channel plate and a rear channel plate positioned generally parallel to each other, wherein the outlet channel is positioned in a direction opposite of the incoming water that passes through the inlet positioned proximate to the lower diverter surface of the chute, and wherein the chute having a vertical top chute plate adjacent and below the outlet channel, wherein the outlet channel is positioned at an angle of approximately 45° relative to a vertical plane of the vertical top chute plate, to direct water through the outlet channel such that water is ejected from the opening toward the body of water.

15. The breakwall system of claim 14, wherein each step has a riser and a tread, wherein the tread is substantially sloped downward in a direction of the body of water.

16. The breakwall system of claim 14, further comprising a deflector above the inlet, wherein the deflector comprises an upwardly and outwardly curved surface.

17. The breakwall system of claim 14, wherein each diverter is tapered in a horizontal direction such that the outlet is narrower than the inlet.

18. A breakwall diversion system, comprising:
a plurality of diverters, the plurality of diverters being in fluid communication with a body of water;
the plurality of diverters each having an inlet facing the body of water;
the plurality of diverters each having a chute, wherein the chute has a lower diverter surface and an upper diverter surface, wherein the lower diverter surface and the upper diverter surface curve upward in the direction of a top surface of the diversion system;
the lower diverter surface having a plurality of steps;
wherein each step has a riser and a tread;
the channel extending from the chute to an outlet in the top surface of the diversion system in a direction toward the body of water such that water is ejected from the channel toward the body of water;
wherein the plurality of diverters alternate between square diverters and tapered diverters;
wherein a first side of a first tapered diverter is welded to a sheet pile cover at a first interconnection and a second side of the first tapered diverter is welded to the sheet pile cover at a second interconnection
wherein the cover comprised of apertures cut in a section of sheet pile and wherein the cover is integral with a sheet pile wall;
wherein the cover includes apertures for allowing incoming water to enter the plurality of diverters;
wherein the sheet pile wall extends below the cover from the diverter to the ground;
wherein the sheet pile has been driven in to a ground; and
a deflector above the inlet, wherein the deflector comprises an upwardly and outwardly curved surface.

19. The breakwall system of claim 18, wherein a top chute plate connects to a rear channel plate; the rear channel plate being positioned across from a front channel plate, thereby forming a channel.

20. The breakwall system of claim 18, wherein a distance between the first interconnection and the second interconnection is equivalent to three segments of sheet pile; wherein a square diverter is attached to a segment of sheet pile cover immediately adjacent to the first tapered diverter.

* * * * *